Aug. 27, 1935.  A. TEN BOSCH, NJZN  2,012,374
PROCESS FOR REMOVING GASES FROM POROUS MATERIALS
Filed March 8, 1932
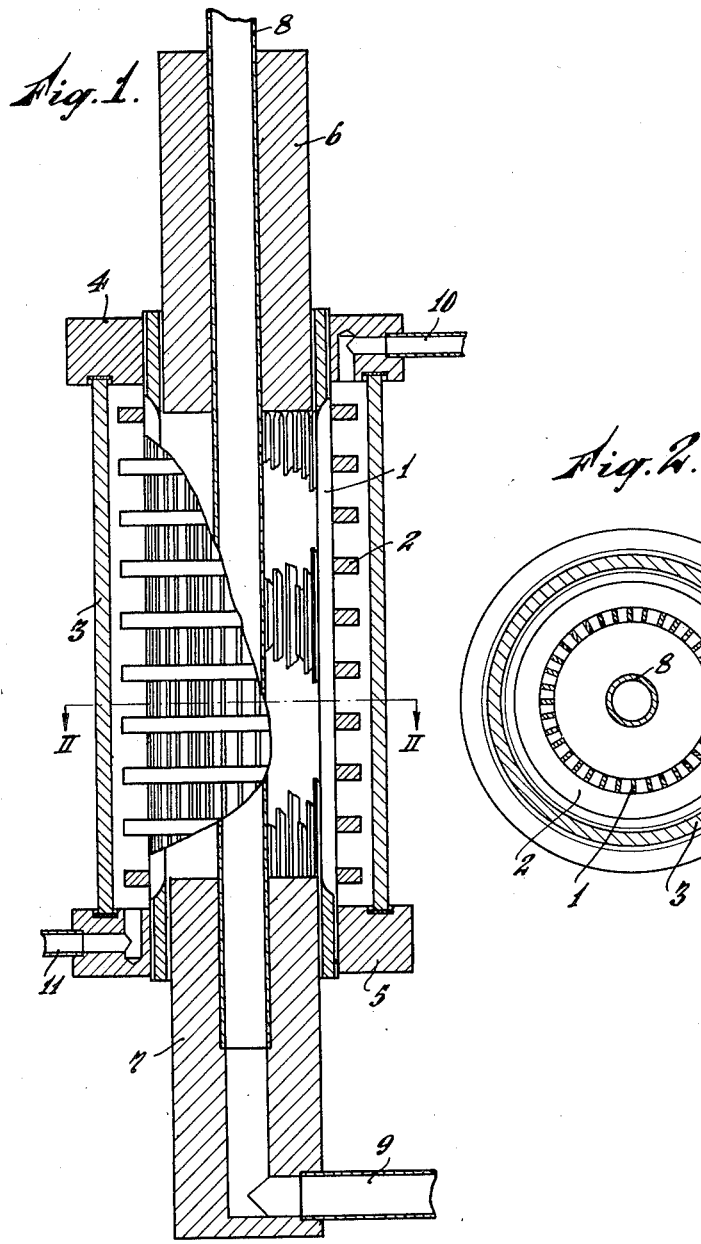
Inventor:-
Abraham ten Bosch Njzn
by E. F. Wenderoth,
Atty.

Patented Aug. 27, 1935

2,012,374

UNITED STATES PATENT OFFICE 2,012,374

PROCESS FOR REMOVING GASES FROM POROUS MATERIALS

Abraham ten Bosch, NJzn, Arnhem, Netherlands, assignor to Naamlooze Vennootschap; Maatschappij tot Exploitatie van "ten Bosch Octrooien N. V.", Arnhem, Netherlands, a corporation of the Netherlands Application March 8, 1932, Serial No. 597,642
In the Netherlands March 19, 1931

2 Claims. (Cl. 44—10)

In my prior application No. 446,165 I describe a process for reducing the amount of liquid in materials containing many capillary spaces. According to the said process a fall of the so-called tangential pressure from the interior of the mass to the outer surface is effected, whereby the liquid is caused to flow in the direction towards the outflow openings of the capillary spaces under the influence of the molecular forces acting in the liquid, and an external pressure is simultaneously exerted on the mass. This process is based on the following principle:

From the law of van der Waals it follows that in liquids and gases which are in equilibrium the kinetic pressure at a given point is equal in all directions.

The kinetic pressure consists of the sum of the external pressure $p$ and the molecular pressure (molecular attraction) $M$, so that at any point the kinetic pressures in two directions $p_1+M_1$ and $p_2+M_2$ are equal.

The liquid in a capillary tube is, dependent upon the width of the capillary tube, to a greater or lesser extent under the influence of the attraction of the wall of the capillary tube. It may therefore be said that in a capillary space the liquid has a surface layer which is retained by the wall, whereas the liquid which is not subjected to the influence of the attraction of the wall may be called the homogeneous phase. The part of the liquid which is subjected to the influence of the attraction of the wall, also has various molecular attractions in different directions, because in the direction perpendicular to the wall the molecular attraction may be greater or smaller than in the direction parallel to the wall.

Generally speaking, the value of $M$ in the direction perpendicular to the wall will be other than in the direction along the wall, and it also follows from this that the pressure in the direction along the wall $p$, which has been given by van der Waals the name "tangential pressure", has another value than the pressure $p$ which is directed perpendicularly to the wall.

For further details concerning the "tangential pressure", reference may be made to a publication by Hulshof in the "Zeitschrift fur Physikalische Chemie", 1927, Heft I and II.

According to the invention the same principle can be utilized for removing gases from materials containing many capillary spaces. It has been found that the gas layers adhering to the surfaces of the solid particles or present in the capillary spaces of the said materials, move under the action of the fall of the tangential pressure in the direction of the said fall, in the same manner as liquids.

The invention consists in a process for removing gases from dry substances containing many capillary spaces, which process comprises effecting a fall of the tangential pressure of the gas present in the capillary spaces towards the outflow openings for the gas, by bringing about and maintaining a difference of temperature between the interior of the mass and the outflow openings for the gas, and simultaneously exerting an external pressure.

According to a preferred embodiment of the invention briquettes are manufactured from pulverized coal in the manner described above.

It is known that coal in a very finely divided condition, e. g. coal powder, generally cannot be compressed into firm briquettes. If the coal powder is compressed under a very heavy pressure, the product after being removed from the press shows little or no coherence, so that the briquette is easily desintegrated. In order to obtain a cohering mass it is necessary to use binding agents, such as pitch and similar materials. The fact that the mass compressed without a binding agent has a very weak coherence most probably can be ascribed to the fact, that all the particles of the substance are coated with a gas layer which is firmly held by the molecular attraction of the substance, and consequently can be only partly removed by the pressing process. Owing to the presence of the said gas layers, however, the surfaces of the solid particles do not sufficiently contact with each other, so that the material is not consolidated to the desired degree. After removing the pressure the gas still present in the compressed mass expands, which promotes the disintegration of the briquette.

According to the invention, a fall of the tangential pressure is effected during the compressing process of the coal powder, e. g. by heating the walls of the pressing chamber, the said walls being permeable to gases. The difference of temperature can be simultaneously increased by cooling the interior of the mass.

It has been found that even when applying the pressures usual in making briquettes from lignite coal powder, the powder can be compressed to a compact mass having a very strong coherence. In this manner excellent briquettes can be manufactured by a very simple and efficient process without using binding agents.

It is clear that the invention can be utilized for a great many other solid materials, both for consolidating more or less finely divided solid substances, and for removing air or other gases from a porous, already cohering solid mass.

In the drawing a construction capable of carrying out the process is illustrated, but it must be remembered that such construction is merely illustrative and is not to be construed in any way as limiting applicant's process.

Fig. 1 is an elevational view with the major portion broken away to show a vertical sectional view of an apparatus for carrying out the process, and Fig. 2 is a horizontal sectional view along the line II—II of Fig. 1.

In the drawing, in which similar reference characters refer to like parts throughout, the apparatus consists of a pressing chamber 1 which is surrounded by a jacket 3 through which a hot liquid or gas may be passed. The wall of the pressing chamber comprises vertical ribs, parts of which are shown in section broken away at the right side of Fig. 1, and which are arranged so as to leave spaces of approximately 0.2 mm. between them. The ribs are held together by the reinforcing rings 2 shown particularly in the left part of Fig. 1, which shows an apparatus without the jacket.

The material to be pressed is enclosed by the pistons 6 and 7. Both pistons are perforated. A tube 8—9 passes through the holes and serves for cooling the material in the pressing chamber by means of a cooling liquid flowing through the tube. The piston 7 is fixed in the position shown in the drawing, and the piston 6 can be operated by hand or mechanically while sliding along the tube 8.

The chamber for the heating liquid or gas is closed at the top and bottom by the covers 4 and 5, which are firmly connected both with the wall of the pressing chamber and the jacket. The hot liquid is introduced by the inlet 10 and removed by the outlet 11.

For carrying out the process according to the invention, the material, for example, powdered coal, with a temperature of about 10° C., is introduced into the pressing chamber. Mineral oil at a temperature of 100° C. is passed through the jacket, and at the same time oil of a temperature of about 15° C. is caused to flow through the tube 8. The piston 6 is now moved downwardly so as to exert a pressure upon the material in the pressing chamber. The pressure is increased from 2 atm. at the start, to about 60 atm. at the end of the pressing operation. The coal powder can be pressed without difficulty to briquettes having a very satisfactory coherence.

The time for the process will depend entirely upon the size of the apparatus, the pressure used, etc. Good results may be obtained in a time varying from ten minutes in laboratory apparatus, to about one hour when carrying out the process upon a large scale. The invention is particularly adapted to be used in continuously operating presses, in which case the time during which the material is exposed to the pressing conditions is relatively short.

I claim:—

1. Process for manufacturing briquettes from pulverized coal in the substantial absence of a binder, comprising preliminarily forming the coal particles into a shaped mass having a plurality of capillaries opening along the extent of the surface of the mass, subjecting the surface of said shaped mass to a temperature below that at which chemical decomposition of those particles of coal near the surface of the mass will occur, but sufficient to maintain a difference of temperature between the interior of the mass and the surface thereof, thereby effecting a fall of the tangential pressure of the gas present in the capillary spaces between the particles, and simultaneously expelling the gas exteriorly through said capillaries by subjecting said mass to externally-applied high pressure, thereby forming a briquette.

2. Process for manufacturing briquettes from pulverized solid carbonizable material capable of briquetting due to mutual coherence of particles of the material upon removal of the surface layers of adhering gases, in the substantial absence of a binder, comprising preliminarily forming the particles of solid carbonizable material into a shaped mass having a plurality of capillaries opening along the extent of the surface of the mass, subjecting the surface of said shaped mass to a temperature below that at which chemical decomposition of those particles of solid carbonizable material near the surface of the mass will occur, but sufficient to maintain a difference of temperature between the interior of the mass and the surface thereof, thereby effecting a fall of the tangential pressure of the gas present in the capillary spaces between the particles, and simultaneously expelling the gas exteriorly through said capillaries by subjecting said mass to externally-applied high pressure, thereby forming a briquette.

ABRAHAM TEN BOSCH, NJzn.